(12) United States Patent
Shih et al.

(10) Patent No.: US 11,907,978 B2
(45) Date of Patent: Feb. 20, 2024

(54) SUBSCRIPTION-BASED ELECTRIC VEHICLE CHARGING MANAGEMENT METHODS AND SYSTEMS

(71) Applicant: Noodoe Group Inc., Wilmington, DE (US)

(72) Inventors: En-Yu Shih, Taipei (TW); Yu-Ting Liou, Taipei (TW); Yi-An Hou, Taipei (TW)

(73) Assignee: NOODOE GROUP INC., Wilmington, DE (US)

( * ) Notice: Subject to any disclaimer, the term of this patent is extended or adjusted under 35 U.S.C. 154(b) by 160 days.

(21) Appl. No.: 17/560,325

(22) Filed: Dec. 23, 2021

(65) Prior Publication Data
US 2022/0277366 A1 Sep. 1, 2022

(30) Foreign Application Priority Data
Feb. 26, 2021 (TW) ................................ 110107101

(51) Int. Cl.
*G06Q 30/00* (2023.01)
*G06Q 30/0601* (2023.01)
*B60L 53/66* (2019.01)
*H02J 7/00* (2006.01)
*B60L 53/65* (2019.01)

(52) U.S. Cl.
CPC .......... *G06Q 30/0601* (2013.01); *B60L 53/65* (2019.02); *B60L 53/665* (2019.02); *H02J 7/00032* (2020.01); *H02J 7/007188* (2020.01)

(58) Field of Classification Search
CPC . G06Q 30/06–08; B60L 53/665; B60L 53/65; H02J 7/00032; H02J 7/007188
See application file for complete search history.

(56) References Cited

U.S. PATENT DOCUMENTS

| | | | | |
|---|---|---|---|---|
| 8,571,981 | B1 * | 10/2013 | Laaser | G06Q 20/102 709/227 |
| 9,317,086 | B2 * | 4/2016 | Sellschopp | B60L 53/305 |
| 10,714,955 | B2 * | 7/2020 | Penilla | B60L 1/06 |
| 2011/0191265 | A1 * | 8/2011 | Lowenthal | B60L 53/65 705/412 |

* cited by examiner

*Primary Examiner* — Ethan D Civan
(74) *Attorney, Agent, or Firm* — McClure, Qualey & Rodack, LLP

(57) ABSTRACT

Subscription-based electric vehicle charging management methods and systems are provided. A server receives charging request with at least a user identification code from an electric vehicle charging station or a mobile device through a network. The server searches a database according to the user identification code to obtain contract situation corresponding to the user identification code and determines whether the contract situation is in a contract expiration status or an arrears unpaid status. When the contract situation is not in the contract expiration status or the arrears unpaid status, the server instructs the electric vehicle charging station to perform a charging operation. When the contract situation is in the contract expiration status or the arrears unpaid status, the server transmits a charging rejection instruction to the electric vehicle charging station. In response to the charging rejection instruction, the electric vehicle charging station rejects the charging request.

11 Claims, 8 Drawing Sheets

SUBSCRIPTION-BASED ELECTRIC VEHICLE CHARGING MANAGEMENT METHODS AND SYSTEMS

BACKGROUND OF THE INVENTION

Field of the Invention

The disclosure relates generally to electric vehicle charging management methods and systems, and, more particularly to subscription-based electric vehicle charging management methods and systems that can perform charging management of electric vehicle charging stations in a charging field.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Most of the power facility in the field has already been constructed. It is expensive to update the power facility, such as the capacity of the electric panel, and the construction time is very time-consuming. Generally, the number of electric vehicle charging stations that can be installed in a single charging field is limited by the existing maximum load capacity of the existing field. Therefore, in the case of limited electric vehicle charging stations, the driver of an electric vehicle may have to spend time to wait because the charging station is in use, or need to find other nearby charging stations for charging operations, which causes inconvenience in use, and reduces the willingness to adopt electric vehicles.

In some charging fields, common and shared electric vehicle charging stations are usually built to allow electric vehicle users in the charging field to perform electric vehicle charging operations. The manager of the charging field can perform the billing operation for the respective charging operation after each charging operation is completed to charge the corresponding charging fee. However, for some electric vehicle users who frequently use electric vehicle charging stations for charging, the existing charging billing methods may not meet the real needs of users, and thus more flexible billing mechanism such as subscription-based charging billing mechanism for electric vehicles is required.

BRIEF SUMMARY OF THE INVENTION

Subscription-based electric vehicle charging management systems and methods are provided.

In an embodiment of a subscription-based electric vehicle charging management system, a server first receives a charging request via a network from an electric vehicle charging station or a mobile device, wherein the charging request includes at least a user identification code. The server searches a database to obtain a contract situation corresponding to the user identification code according to the user identification code. The server determines whether the contract situation corresponding to the user identification code is in a contract expiration status or an arrears unpaid status. When the contract situation is not in the contract expiration status or the arrears unpaid status, the server instructs the electric vehicle charging station to perform a charging operation through the network. When the contract situation is in the contract expiration status or the contract situation is in the arrears unpaid status, the server transmits a charging rejection instruction to the electric vehicle charging station through the network. In response to the charging rejection instruction, the electric vehicle charging station rejects the charging request.

An embodiment of a subscription-based electric vehicle charging management system for use in a charging field comprises at least one electric vehicle charging station and a server. The server is coupled to the electric vehicle charging station through a network and receives a charging request from the electric vehicle charging station or a mobile device through the network, wherein the charging request includes at least a user identification code. The server searches a database to obtain a contract situation corresponding to the user identification code according to the user identification code, and determining whether the contract situation corresponding to the user identification code is in a contract expiration status or an arrears unpaid status. When the contract situation is not in the contract expiration status or the arrears unpaid status, the server instructs the electric vehicle charging station to perform a charging operation through the network. When the contract situation is in the contract expiration status or the contract situation is in the arrears unpaid status, the server transmits a charging rejection instruction to the electric vehicle charging station through the network, wherein the electric vehicle charging station rejects the charging request in response to the charging rejection instruction.

In some embodiments, the server further generates an online payment link based on the contract situation and determines whether a payment operation has been completed through the online payment link, and the server further updates the contract situation and transmits a charging permission instruction to the electric vehicle charging station through the network when the payment operation has been completed through the online payment link.

In some embodiments, the electric vehicle charging station further sets a flag to a first value in response to the charging rejection instruction, wherein the electric vehicle charging station cannot output power when the flag is marked as the first value.

In some embodiments, the server further transmits a charging permission instruction to the electric vehicle charging station via the network, and in response to the charging permission instruction, the electric vehicle charging station sets the flag to a second value, wherein the electric vehicle charging station allows the output of power when the flag is marked as the second value.

In some embodiments, the server further transmits the contract situation to the electric vehicle charging station through the network, and when the network is disconnected and the electric vehicle charging station cannot be connected to the server, the electric vehicle charging station determines whether the contract situation corresponding to the user identification code is in the contract expiration status or the arrears unpaid status in response to the charging request, performs the charging operation to output power when the contract situation is not in the contract expiration status or the arrears unpaid status and rejects the charging request when the contract situation is in the contract expiration status or the contract situation is in the arrears unpaid status.

In some embodiments, the electric vehicle charging station further obtains vehicle identification data of a vehicle and transmits the vehicle identification data to the server through the network. The server determines whether the vehicle identification data corresponds to the user identification code or the corresponding contract situation. When the vehicle identification data corresponds to the user identification code or the corresponding contract situation, the server instructs the electric vehicle charging station to perform the charging operation through the network.

Subscription-based electric vehicle charging management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
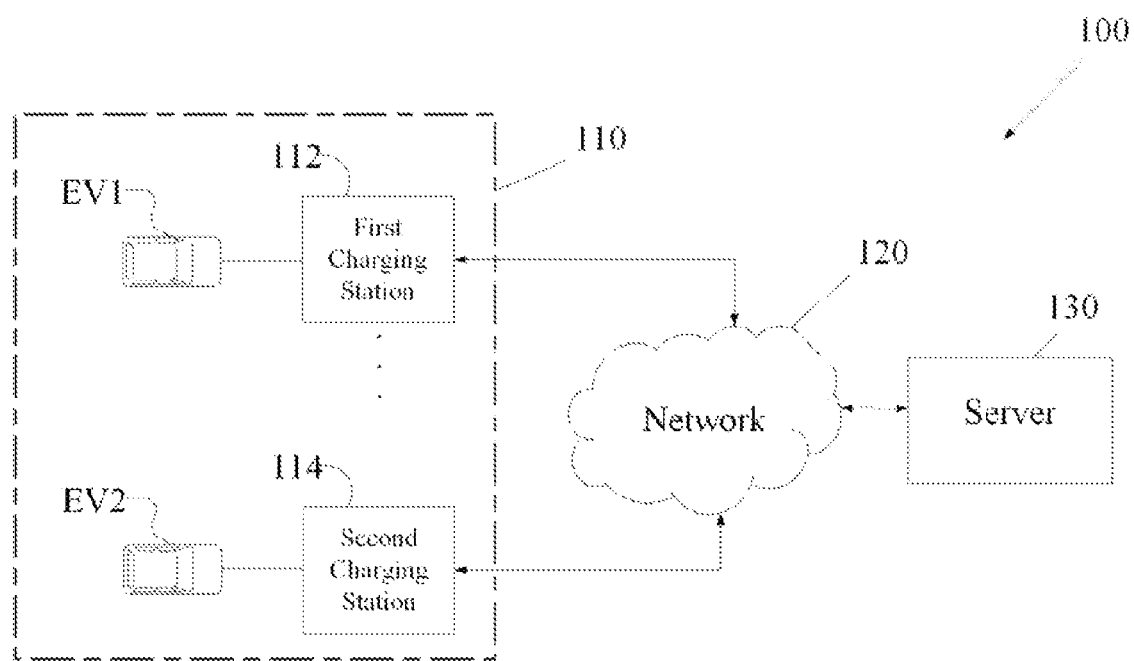
FIG. 1 is a schematic diagram illustrating an embodiment of a subscription-based electric vehicle charging management system of the invention.

FIG. 1 is a schematic diagram illustrating an embodiment of a subscription-based electric vehicle charging management system of the invention. The subscription-based electric vehicle charging management system 100 can be used in a charging filed 110 with a plurality of electric vehicle charging stations. It is noted that, the charging filed 110 has a power limitation. As shown in FIG. 1, the subscription-based electric vehicle charging management system 100 comprises a plurality of electric vehicle charging stations, e.g., a first charging station 112 and a second charging station 114, and a server 130 respectively connected with the first charging station 112 and the second charging station 114 via a network 120. The respective charging stations can provide electric vehicles (EV1, EV2) of electric vehicle users for charging operations. In some embodiments, the network 120 may be a wired network, a telecommunication network, and a wireless network, such as a Wi-Fi network. The server 130 can receive various data from the first charging station 112 and the second charging station 114 via the network 120, and transmit related signals to the first charging station 112 and the second charging station 114. The first charging station 112 and the second charging station 114 can perform related operations according to the signals received from the server 130. For example, when the electric vehicle EV1 is coupled to the first charging station 112 through a charging gun of the first charging station 112 for a charging operation, the first charging station 112 can continuously transmit charging information corresponding the charging operation of the electric vehicle EV1 via the network 120, and the server 130 can receive the charging information of the corresponding charging operation from the first charging station 112 via the network 120. Similarly, when the electric vehicle EV2 is coupled to the second charging station 114 through a charging gun of the second charging station 114 to perform a charging operation, the second charging station 114 can continuously transmit the charging information corresponding the charging operation of the electric vehicle EV2 via the network 120, and the server 130 can receive the charging information of the corresponding charging operation from the second charging station 114 via the network 120.

It is noted that the user can connect the electric vehicle EV1 and the first charging station 112 to each other, such as inserting a charging gun into the charging port of the electric vehicle to send a charging request corresponding to the first charging station 112 to use the first charging station 112. The first charging station 112 performs a charging operation for the electric vehicle EV1. Similarly, the user can connect the electric vehicle EV2 and the second charging station 114 to each other, such as inserting a charging gun into the charging port of the electric vehicle to send a charging request corresponding to the second charging station 114 to use the second charging station 114. It is understood that, in some embodiments, the server 130 may directly or indirectly receive a charging request from a mobile device (not shown in FIG. 1) of the owner of the electric vehicle EV1, and generate a charging authorization command based on the charging request and transmit it to the first charging station 112 via the network 120, so that the first charging station 112 outputs power to the electric vehicle EV1, such as an electric scooter or an electric car, which is electrically connected to it, or prohibits the first charging station 112 from outputting power to the electric vehicle EV1. It is reminded that, in some embodiments, the charging request may be accompanied by an identity authentication and/or a payment mechanism, and the charging authorization command will only be generated after the identity authentication and/or payment mechanism is completed. In some embodiments, the user of the electric vehicle EV1 can use his/her mobile device to download and install an application to generate a charging request through the user interface of the application. In some embodiments, the user can scan a Quick Response Code (QR code) on the first charging station 112 through the scanning function of the application to generate the above-mentioned charging request, thereby starting a charging operation. In some embodiments, the user can select a specific charging station through the application and execute an activation function to generate the above-mentioned charging request, thereby starting a charging operation. It is understood that, in some embodiments, the owner of the electric vehicle EV1 can use an RFID card to approach an induction area (not shown in FIG. 1) on the first charging station 112 to generate a corresponding charging request, and sent it to the server 130 via the network 120. It is reminded that, in some embodiments, each user can have an RFID card.

It is noted that, the device corresponding to the owner of the electric vehicle can be any electronic device capable of Internet access, such as mobile devices, such as mobile phones, smart phones, personal digital assistants, global positioning systems, and notebook computers. In some embodiments, the mobile device can receive status information and notifications of the corresponding charging operation from the cloud management server 130 via the network 120. In some embodiments, the status information and notification may include notifying that the electric vehicle has stopped charging, notifying that the vehicle needed to be moved, and/or notifying that the charging gun of the electric vehicle charging device has been disconnected from the electric vehicle, and so on.

As mentioned above, the charging field 110 has a power limit. The server 130 can perform a load adjustment operation for the electric vehicle charging stations in the charging field 110. Specifically, the server 130 can generate an instruction and send the instruction to the charging station (112, 114) via the network 120 to control the charging station to output power for charging with a specified power parameter, such as a specified amperage, during a specific period of time to the electric vehicle connected to the station, or to prohibit the charging station from outputting power to the electric vehicle.

Figure 2:
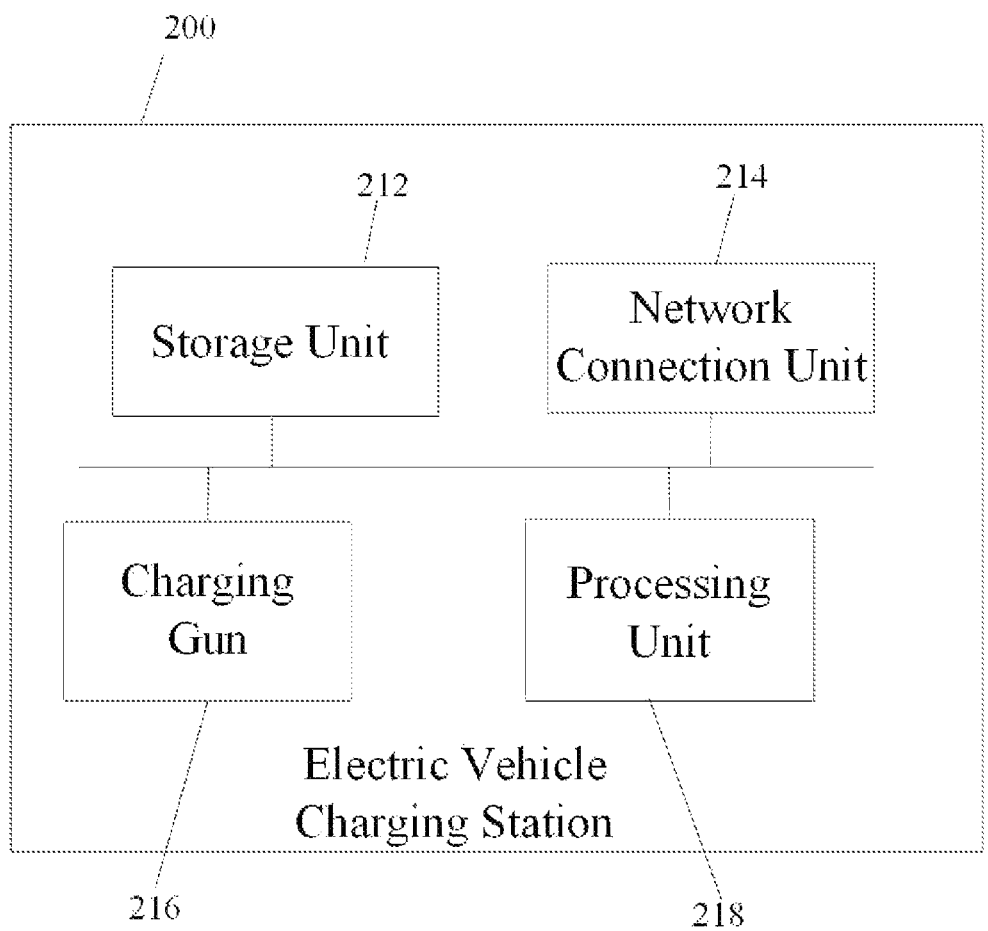
FIG. 2 is a schematic diagram illustrating an embodiment of an electric vehicle charging station of the invention.

FIG. 2 is a schematic diagram illustrating an embodiment of an electric vehicle charging station of the invention. The electric vehicle charging station 200 shown in FIG. 2 can be applied to the first charging station 112 and the second charging station 114 in FIG. 1, which has processing and computing capabilities to perform charging management operations for the electric vehicle charging station 200. The electric vehicle charging station 200 has a network connection capability to receive, download or update various parameters and information required for charging management calculations.

The electric vehicle charging station 200 at least comprises a storage unit 212, a network connection unit 214, a charging gun 216, and a processing unit 218. The storage unit 212 may be a memory or a database for storing and recording related data. The data may be related information such as charging station ID of the electric vehicle charging station and charging requests. It should be noted that the aforementioned information is only example, and the invention is not limited thereto. The network connection unit 214 can use a network, such as a wired network, a telecommunications network, and a wireless network, such as a Wi-Fi network, to receive, download, or update various parameters and information required for charging management operations. The charging gun 216 may include one or more charging connectors that meet the same charging interface specification or meet different charging interface specifications, and are electrically connected to the corresponding electric vehicle. The processing unit 218 can control the operations of related software and hardware in the electric vehicle charging station 200, and cooperate with the server 130 to execute the subscription-based electric vehicle charging management method of the invention. Related details will be described later. It is noted that, in some embodiments, the processing unit 218 may be a general-purpose controller, a Micro-Control Unit, MCU, or a Digital Signal Processor, DSP, etc., to provide functions of data analysis, processing and calculation, but the present invention is not limited thereto. In one embodiment, the processing unit 218 may use the network connection unit 214 to transmit the power state of the corresponding electric vehicle through a network for a cloud management server, such as the cloud server 130, for subsequent charging management. In another embodiment, the processing unit 218 can obtain the power parameter of a charging operation from the server 130, determine the output power according to the power parameter received from the server 130, and output the power to at least one electric vehicle through the charging gun 216 to perform the charging operation. It is noted that, in some embodiments, the electric vehicle charging station 200 may comprise an RFID reading unit for sensing information of an RFID card, such as a user ID code of a community user.

It is understood that, the electric vehicle charging station 200 has an upper power limit value and a lower power limit value. Specifically, the electric vehicle charging station 200 can use the upper power limit value as the power parameter at the highest to output power to the electric vehicle during a charging operation. On the other hand, the electric vehicle charging station 200 needs to use the lower power limit value as the power parameter at least to output power to the electric vehicle during a charging operation. It must be noted that, charging stations of different brands and models may have different upper power limit values for output power and lower power limit values for output power. The present invention is not limited to any value, and the value may be different for different charging stations.

Figure 3:
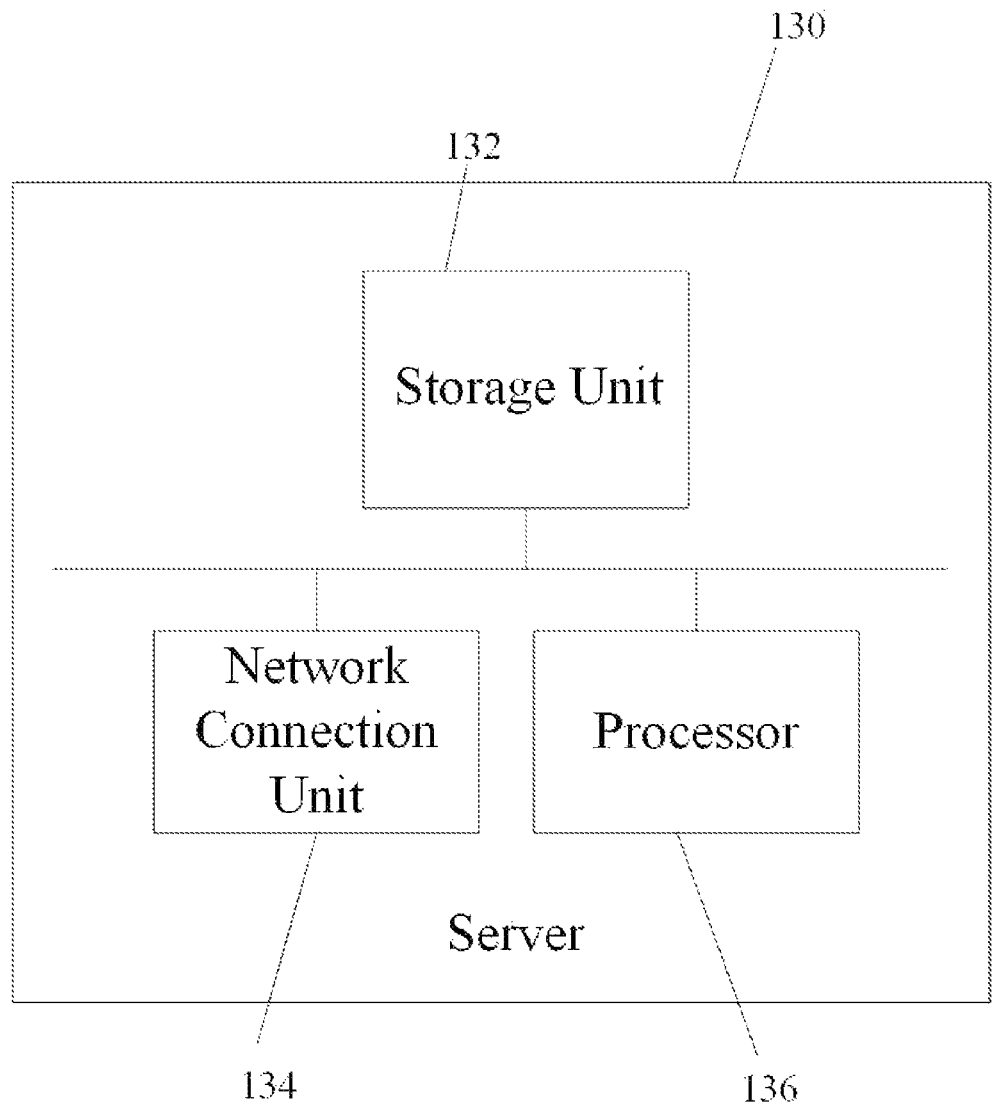
FIG. 3 is a schematic diagram illustrating an embodiment of a server of the invention.

FIG. 3 is a schematic diagram illustrating an embodiment of a server of the invention. As shown in FIG. 3, the server 130 of the invention can be any processor-based electronic device, which comprises at least a storage unit 132, a network connection unit 134, and a processor 136. It is noted that, the server 130 can receive various data corresponding to a plurality of electric vehicle charging stations in a charging field. The server 130 can directly or indirectly receive a charging request from a mobile device, and after completing actions such as identity confirmation in response to the charging request, generate a charging authorization command and transmit it to the corresponding electric vehicle charging station via the network. In response to the charging authorization command, the electric vehicle charging station is allowed to output power to an electric vehicle (for example, an electric motorcycle or an electric vehicle, etc.) that is electrically connected to it, or prohibit the electric vehicle charging station from outputting power to the electric vehicle.

The storage unit 132 may be a memory, which can store and record related data, such as various data of the electric vehicle charging stations. It is understood that, in some embodiments, the storage unit 132 may comprise a database (not shown in FIG. 3) for recording relevant information of the corresponding individual user in the corresponding charging field, such as user identification information and the corresponding user identification code. It is noted that, in some embodiments, one user may register multiple identification codes. In other words, one user information can correspond to multiple user identification codes. In addition, in some embodiments, the database can also record the contract situation of individual subscription users, such as whether the contract is in a contract expiration status or an arrears unpaid status (i.e., a status that the arrears has not been paid). It is noted that, in some embodiments, individual user can subscribe to the electric vehicle charging service in a specific field through a contract, wherein the contract has a corresponding contract period or contract expiration date and subscription fee, and the user can renew the contract at the end of the contract period or before the contract expiration date and pay the specified subscription fee to update the contract. In some embodiments, the subscription fee may be charged for a predetermined period of time, such as a month, a quarter or a year, but the invention is not limited thereto. For example, in one embodiment, the contract period can be set to one month, and the subscription fee is charged a fixed monthly fee every month. When the user pays the monthly fee for a specific month on time, the user can perform unlimited free charging operations in this specific month. In other words, the subscription charging service for one month charging free can be provided. When the contract does not exceed the expiration date of the contract and there is no record of arrears, the contract is in the status of unexpired contract and no arrears. When the contract has exceeded the contract expiration date and has not been renewed, the contract is in the contract expiration status. When the user corresponding to the contract has a record of arrears in payment of management fee or charging fee, the contract is in the arrears unpaid status. Through the network connection unit 134, the server 130 can be coupled to and communicates with the electric vehicle charging stations (112, 114) via the network 120, such as a wired network, a telecommunications network, and a wireless network, such as a Wi-Fi network, and transmits related data/signals/commands to different electric vehicle charging stations via the network 120 to control whether the electric vehicle charging stations output power, and specify power parameters for outputting power to electric vehicles. The processor 136 can control the operations of related software and hardware in the server 130, and execute the subscription-based electric vehicle charging management method of the invention. The relevant details will be described later. It is understood that, in some embodiments, the processor 136 may be a general-purpose controller, a Micro-Control Unit, MCU, or a Digital Signal Processor, DSP, etc., to provide data analysis, processing, and calculation functions.

Figure 4:
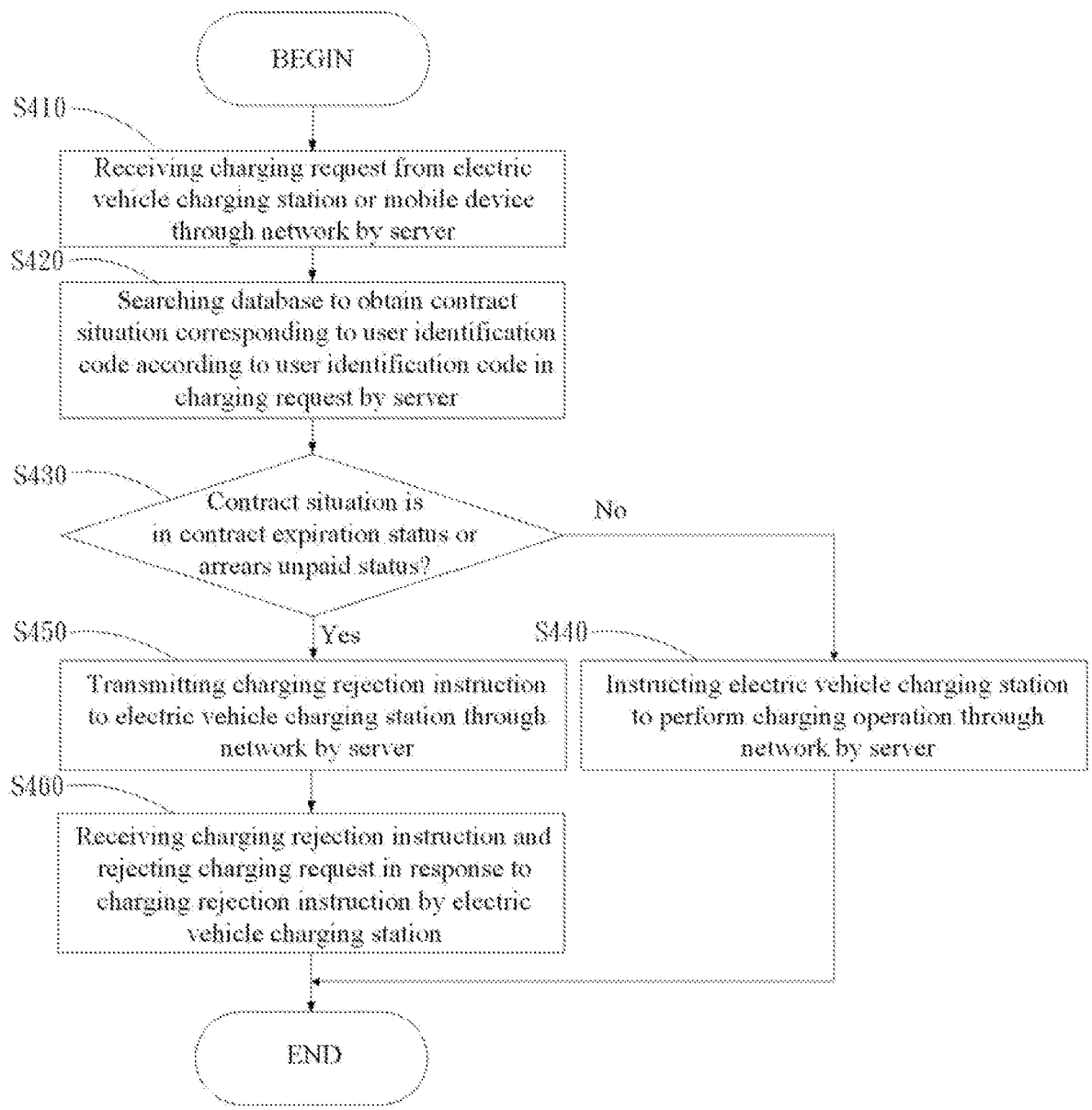
FIG. 4 is a flowchart of an embodiment of a subscription-based electric vehicle charging management method of the invention.

FIG. 4 is a flowchart of an embodiment of a subscription-based electric vehicle charging management method of the invention. The subscription-based electric vehicle charging management method of the invention can be applied to a charging field. The charging field includes a plurality of electric vehicle charging stations and has a power limit. Individual electric vehicle charging stations can be electrically coupled with a remote server through a network.

First, in step S410, the server receives a charging request from a charging station or a mobile device through the network. The charging request includes at least an user identification code and a charging station identification code of the charging station. It should be noted that in some embodiments, a user can connect the electric vehicle EV1 and the electric vehicle charging station, such as a first charging station, to each other, such as plugging the charging gun into the charging interface of the electric vehicle, to send the charging request corresponding to the first charging station. In some embodiments, the server may directly or indirectly receive a charging request from a mobile device of the owner of the electric vehicle EV1. It is noted that in some embodiments, the user can scan a Quick Response Code (QR code) on the first electric vehicle charging station through the scanning function of the application to generate the charging request. In some embodiments, the user can use an application in the mobile device to select the first charging station and execute an activation function to generate the above-mentioned charging request. In some embodiments, the owner of the electric vehicle EV1 can use an RFID card to approach the induction area on the first charging station to generate a corresponding charging request. Next, in step S420, the server searches a database to obtain a contract situation corresponding to the user identification code according to the user identification code in the charging request. In other words, the server can retrieve the database to obtain the contract situation corresponding to the user identification code. After obtaining the contract situation corresponding to the user identification code, in step S430, the server determines whether the contract situation is in the contract expiration status or the arrears unpaid status. As aforementioned, the database can record the contract situation of individual subscription users, such as whether the contract is in a contract expiration status or an arrears unpaid status. In other words, the server can search the database to obtain information on whether the contract situation of a user corresponding to the user identification code is in the contract expiration status or the arrears unpaid status. When the contract situation is not in the contract expiration status or the arrears unpaid status (No in step S430), that is, the contract has not expired and there are no arrears unpaid, in step S440, the server instructs the electric vehicle charging station to perform a charging operation through the network. The server continuously obtains a first charging status information from the electric vehicle charging station during the charging operation. It should be noted that the first charging status information includes at least a charging time or a charging amount of power. When the contract situation is in the contract expiration status or the contract situation is in the arrears unpaid status (Yes in step S430), in step S450, the server transmits a charging rejection instruction to the electric vehicle charging station through the network. Then, in step S460, the electric vehicle charging station receives the charging rejection instruction through the network, and the electric vehicle charging station rejects the charging request in response to the charging rejection instruction. In other words, when the contract situation corresponding to the specific user identification code is in the contract expiration status or in the arrears unpaid status, the server instructs the electric vehicle charging station to not perform the charging operation.

Figure 5:
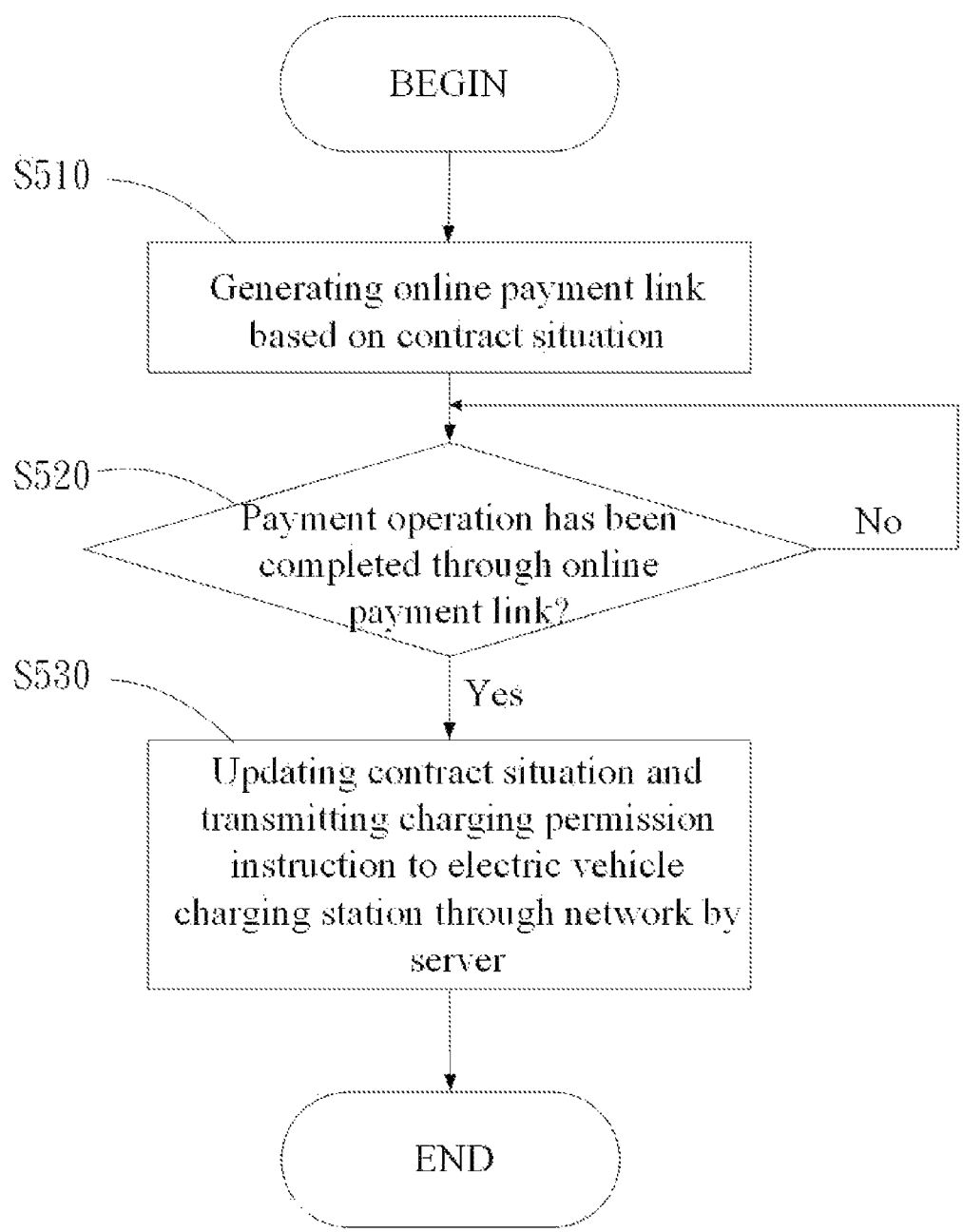
FIG. 5 is a flowchart of another embodiment of a subscription-based electric vehicle charging management method of the invention.

FIG. 5 is a flowchart of another embodiment of a subscription-based electric vehicle charging management method of the invention. The subscription-based electric vehicle charging management method of the invention can be applied to a charging field, such as a community, an office building, and so on. The charging field includes a plurality of electric vehicle charging stations and has a power limit. Individual electric vehicle charging stations can be electrically coupled with a remote server through a network. In this embodiment, the user whose contract situation is in the contract expiration status or the arrears unpaid status can renew the subscription-based charging service by paying certain money through an online payment link.

As mentioned above, the database of the server can record the contract situation of individual users, such as whether the contract is in the contract expiration status or the contract situation is in the arrears unpaid status, such as arrears of management fees or arrears of charging fees. When the contract situation of the specific user identification code is in the contract expiration status or the arrears unpaid status, in step S510, the server generates an online payment link based on the contract situation of the specific user identification code. It is noted that, in some embodiments, the server may send a message including an online payment link to a first mobile device of a user corresponding to the specific user identification code. The user of the first mobile device may use the online payment link to perform a payment operation to make online payment for their arrears or renew their contract through online payment. Then, in step S520, the server determines whether a payment operation has been completed through the online payment link. When the payment operation is not completed through the online payment link (No in step S520), the determination in step S520 is continued. When the payment operation has been completed through the online payment link (Yes in step S520), in step S530, the server updates the contract situation and transmits a charging permission instruction to the electric vehicle charging station through the network such that the electric vehicle charging station performs the charging operation in response to the permission charging instruction.

Figure 6:
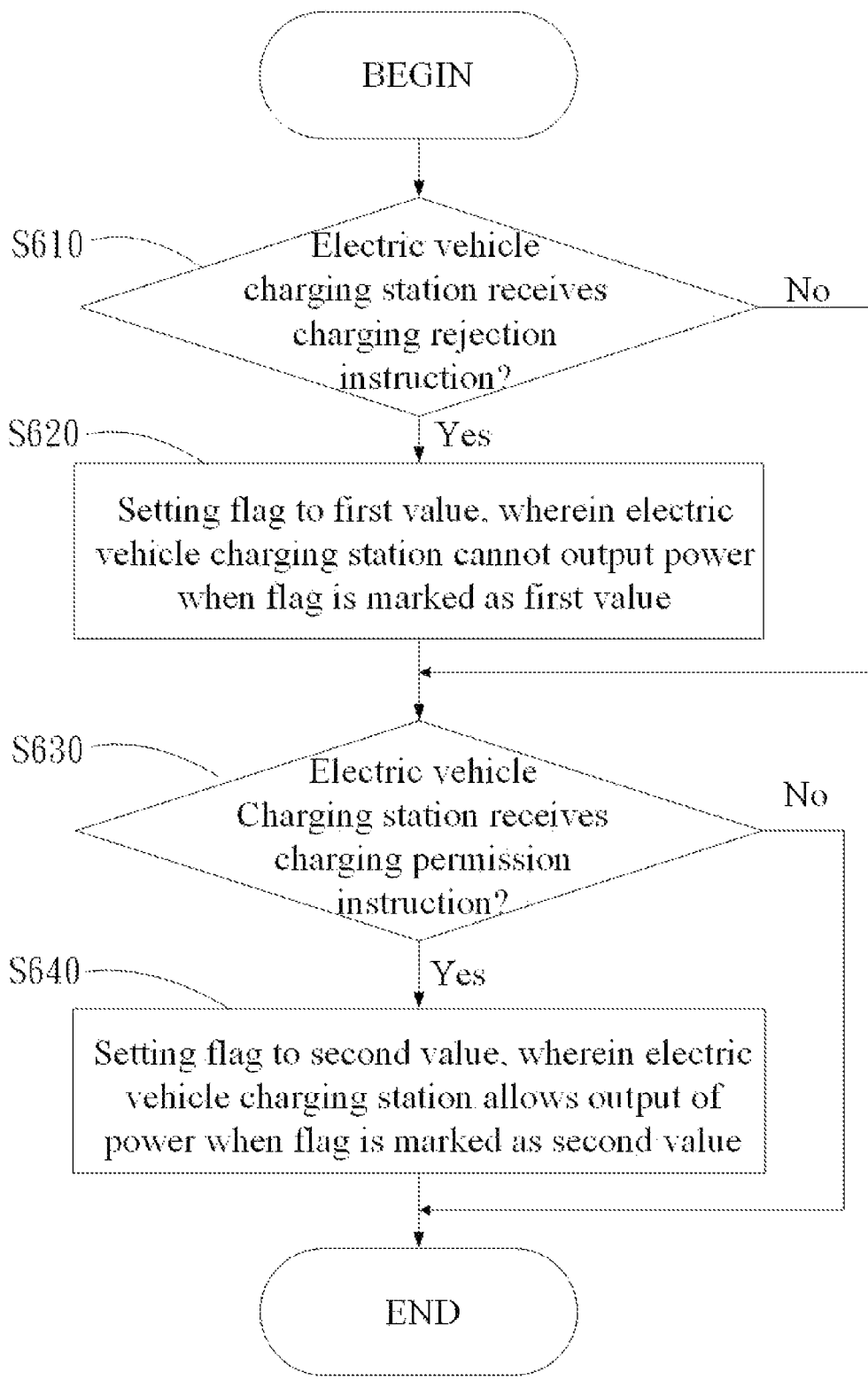
FIG. 6 is a flowchart of an embodiment of a flag setting method of the invention.

FIG. 6 is a flowchart of an embodiment of a flag setting method of the invention. The flag setting method of the invention can be applied to a charging field. The charging field includes a plurality of electric vehicle charging stations and has a power limit. Individual electric vehicle charging stations can be electrically coupled with a remote server through a network. In this embodiment, individual electric vehicle charging station may have a flag, and the individual electric vehicle charging station can change the setting value of the flag according to the instructions received from the server, and determine whether to output power to an electric vehicle according to the setting value of the flag.

First, in step S610, the electric vehicle charging station determines whether a charging rejection instruction is received. As mentioned above, in some embodiments, when the contract situation is in the contract expiration status or the contract situation is in the arrears unpaid status, the server transmits a charging rejection instruction to the electric vehicle charging station through the network. When the electric vehicle charging station does not receive the charging rejection instruction (No in step S610), then the determination in step S630 is performed. When the electric vehicle charging station receives the charging rejection instruction (Yes in step S610), in step S620, it sets the flag to a first value in response to the charging rejection instruction, wherein the electric vehicle charging station cannot output power when the flag is marked as the first value. Then, the determination of step S630 is performed. In step S630, the electric vehicle charging station determines whether a charging permission instruction is received. As mentioned above, in some embodiments, when the contract situation is in the contract expiration status or the contract situation is in the arrears unpaid status, the server can generate an online payment link based on the contract situation and when a payment operation has been completed through the online payment link, the server updates the contract situation and sends the charging permission instruction to the electric vehicle charging station through the network. When the electric vehicle charging station does not receive the charging permission instruction (No in step S630), the flow is ended. When the electric vehicle charging station receives the charging permission instruction (Yes in step S630), in step S640, in response to the charging permission instruction, the electric vehicle charging station sets the flag to a second value, wherein the electric vehicle charging station allows the output of power when the flag is marked as the second value.

Figure 7:
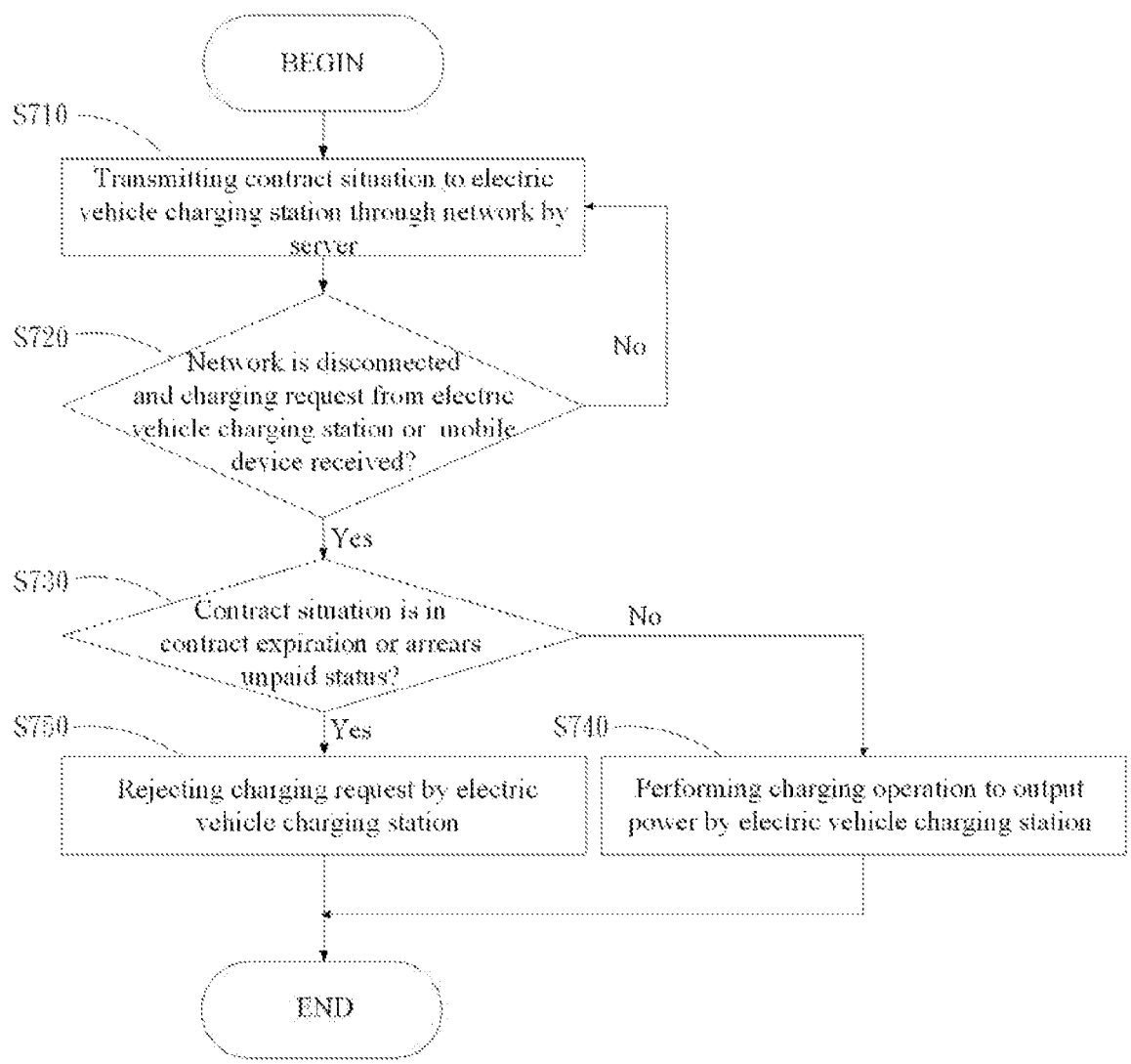
FIG. 7 is a flowchart of another embodiment of a subscription-based electric vehicle charging management method of the invention.

It is understood that in some embodiments, the electric vehicle charging station may be unable to be connected to the server due to the disconnection of the network such that the server cannot perform the charging management of the electric vehicle charging station. Therefore, in order to allow the electric vehicle charging station to perform the charging management of the subscription-based electric vehicle charging station even when the network is disconnected, an offline management mechanism which can be performed by the electric vehicle charging station is provided. FIG. 7 is a flowchart of another embodiment of a subscription-based electric vehicle charging management method of the invention. The subscription-based electric vehicle charging management method of the invention can be applied to a charging field, such as a community, an office building, and so on. The charging field includes a plurality of electric vehicle charging stations and has a power limit. Individual electric vehicle charging stations can be electrically coupled with a remote server through a network.

When the network connection between the electric vehicle charging station and the server is normal, in step S710, the server transmits the contract situation to the electric vehicle charging station via the network. The electric vehicle charging station can store the contract situation in a storage unit when it receives the contract situation. Then, in step S720, the electric vehicle charging station determines whether the network is disconnected and whether a charging request is received from the electric vehicle charging station or the mobile device. The charging request includes at least one user identification code and one charging station identification code of the electric vehicle charging station. It should be noted that in some embodiments, a user can connect the electric vehicle EV1 and the electric vehicle charging station, such as a first charging station, to each other, such as plugging the charging gun into the charging interface of the electric vehicle, to send the charging request corresponding to the first charging station. In some embodiments, the server may directly or indirectly receive a charging request from a mobile device of the owner of the electric vehicle EV1. It is noted that in some embodiments, the user can scan a QR code on the first electric vehicle charging station through the scanning function of the application to generate the charging request. In some embodiments, the user can use an application in the mobile device to select the first charging station and execute an activation function to generate the above-mentioned charging request. In some embodiments, the owner of the electric vehicle EV1 can use an RFID card to approach the induction area on the first charging station to generate the charging request. When the network is not disconnected (that is, the electric vehicle charging station can be connected to the server) or the charging request is not received (No in step S720), the flow returns to step S710. When the network is disconnected so that the electric vehicle charging station cannot be connected to the server and a charging request is received during which the network is disconnected (Yes in step S720), in step S730, the electric vehicle charging station determines whether the contract situation corresponding to the user identification code is in the contract expiration status or the arrears unpaid status in response to the charging request. As mentioned above, the storage unit of the electric vehicle charging station can record the contract situation of individual subscription users, such as whether the contract is in a contract expiration status or an arrears unpaid status. In other words, the server can search the database to obtain information on whether the contract situation of a user corresponding to the user identification code is in the contract expiration status or the arrears unpaid status. In other words, the electric vehicle charging station can obtain information on whether the contract situation of a user corresponding to the user identification code is in the contract expiration status or the arrears unpaid status according to the user identification code. When the contract situation is not in the contract expiration status or the arrears unpaid status (No in step S730), that is, the contract has not expired and there are no arrears unpaid, in step S740, the electric vehicle charging station performs the charging operation to output power. Conversely, when the contract situation is in the contract expiration status or the contract situation is in the arrears unpaid status (Yes in step S730), in step S750, the electric vehicle charging station rejects the charging request. In other words, when the contract situation corresponding to the specific user identification code is in the contract expiration status or the arrears unpaid status, the electric vehicle charging station does not perform the charging operation. In some embodiments, the server may send all users' contract situation to the electric vehicle charging station. In other words, all users are allowed to perform subscription-based electric vehicle charging operations when the network is disconnected. In some embodiments, the server may only transmit the contract situation of specific users to the electric vehicle charging station. In other words, only the specific users are allowed to perform the subscription-based electric vehicle charging operations when the network is disconnected.

Figure 8:
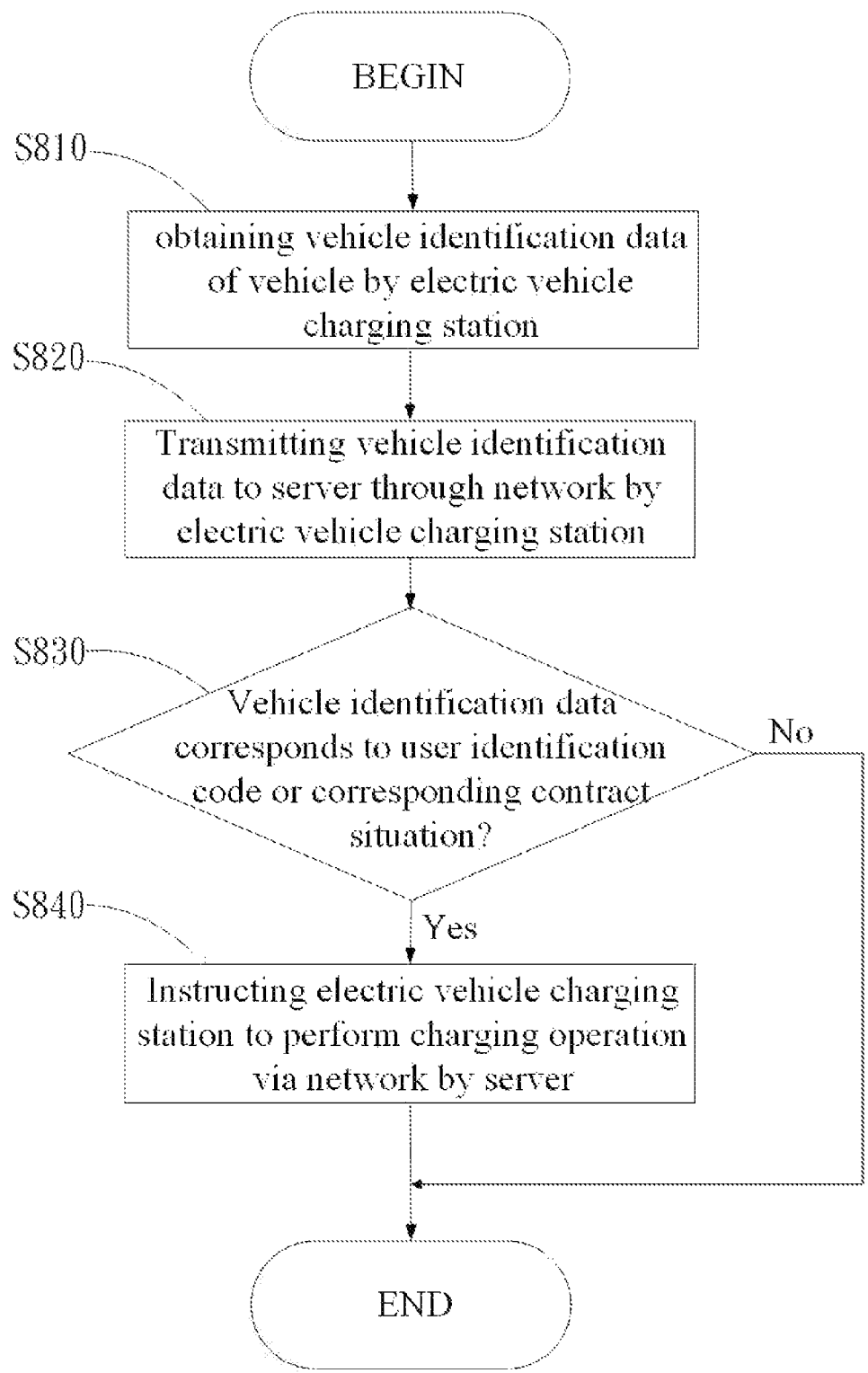
FIG. 8 is a flowchart of another embodiment of a subscription-based electric vehicle charging management method of the invention.

FIG. 8 is a flowchart of another embodiment of a subscription-based electric vehicle charging management method of the invention. The subscription-based electric vehicle charging management method of the invention can be applied to a charging field, such as a community, an office building, and so on. The charging field includes a plurality of electric vehicle charging stations and has a power limit. Individual electric vehicle charging stations can be electrically coupled with a remote server through a network. In this embodiment, the server can further perform the subscription-based electric vehicle charging management based on the contract situation and the vehicle identification data of the corresponding vehicle, such as the license plate number, the owner's information and so on.

As mentioned above, the user can connect the electric vehicle EV1 and the electric vehicle charging station to each other, such as plugging the charging gun into the charging interface of the electric vehicle, to send the charging request corresponding to the electric vehicle charging station. In some embodiments, the server may directly or indirectly receive a charging request from a mobile device of the owner of the electric vehicle EV1. It is noted that in some embodiments, the user can scan a QR code on the electric vehicle charging station through the scanning function of the application to generate the charging request. In some embodiments, the user can use an application in the mobile device to select the electric vehicle charging station and execute an activation function to generate the above-mentioned charging request. In some embodiments, the owner of the electric vehicle EV1 can use an RFID card to approach the induction area on the electric vehicle charging station to generate the charging request.

When the server receives a first charging request from an electric vehicle charging station or a first mobile device through the network, in step S810, the electric vehicle charging station obtains vehicle identification data corresponding to the vehicle, and in step S820, transmits the vehicle identification data to the server through the network. In this step, the electric vehicle charging station can obtain the vehicle identification data of the corresponding vehicle through an object sensing unit (not shown). The object sensing unit can sense the existence of an object in a predetermined space, and obtain corresponding object data from the object. For example, in one embodiment, the object sensing unit may be a camera that detects/senses the existence of an object (for example, a vehicle) in a predetermined space such as a parking space corresponding to the charging device corresponding to the charging device. When the object sensing unit is a camera and the object is a vehicle, the object is a vehicle, the image data serving as the object data taken by the camera (served as the object sensing unit) may comprise image data corresponding to a license plate of the vehicle, wherein the image data corresponding to the license plate of the vehicle includes the vehicle identification data corresponding to the vehicle. In another embodiment, the object sensing unit can also be an electronic tag reader, which can automatically read the data recorded in the electronic tag placed on the object. When the object sensing unit is an electronic tag reader and the vehicle is equipped with a vehicle electronic tag that records data such as a license plate number, the electronic tag data read by the electronic tag reader serving as the object sensing unit may include the vehicle electronic tag data corresponding to the vehicle, and it contains the vehicle identification data such as the license plate number and so on. After the server receives the vehicle identification data through the network, in step S830, the server determines whether the vehicle identification data corresponds to the user identification code or the corresponding contract situation. It is noted that the user identification code and corresponding vehicle identification data corresponding to individual subscription users can be set in the database of the server in advance. As mentioned above, the database can also record the contract status of individual subscription users, such as whether the contract is in a contract expiration status or an arrears unpaid status. In other words, the server can search the database to obtain information on whether the contract status of a user of the corresponding user identification code is in the contract expiration status or the arrears unpaid status and the vehicle identification data of the corresponding user identification code. When the vehicle identification data does not correspond to the user identification code or the corresponding contract situation (No in step S830), the flow is ended. When the vehicle identification data corresponds to the user identification code or its corresponding contract situation (Yes in step S830), in step S840, the server instructs the electric vehicle charging station to perform the charging operation through the network. In some embodiments, the server may continuously obtain a first charging status information from the electric vehicle charging station during the charging operation to track the charging progress and record the charging situation. It should be noted that the first charging status information includes at least a charging time or a charging amount of power.

Therefore, the subscription-based electric vehicle charging management methods and systems of the present invention can allow users to subscribe for electric vehicle charging service in the charging field, and perform charging management on the charging stations set in the charging field according to the contract situation of individual users corresponding to the subscribed electric vehicle charging service, thus providing subscription-based electric vehicle charging service and increasing the management flexibility of charging and billing at the charging stations for managers of corresponding charging fields.

Subscription-based electric vehicle charging management methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A subscription-based electric vehicle charging management method for use in a charging field with at least one electric vehicle charging station and the electric vehicle charging station is connected to a server through a network, comprising:
    receiving a charging request from the electric vehicle charging station or a mobile device through a network by the server, wherein the charging request includes at least a user identification code;
    searching a database to obtain a contract situation corresponding to the user identification code according to the user identification code by the server;
    determining whether the contract situation corresponding to the user identification code is in a contract expiration status or an arrears unpaid status by the server;
    instructing the electric vehicle charging station to perform a charging operation through the network by the server when the contract situation is not in the contract expiration status or the arrears unpaid status;
    transmitting a charging rejection instruction to the electric vehicle charging station through the network by the server when the contract situation is in the contract expiration status or the contract situation is in the arrears unpaid status; and
    in response to the charging rejection instruction, rejecting the charging request by the electric vehicle charging station,
    wherein the method further comprises the steps of:
    transmitting, by the server, the contract situation to the electric vehicle charging station through the network when a network connection between the server and the electric vehicle charging station is connected;
    determining, by the electric vehicle charging station, whether the network is disconnected so that the electric vehicle charging station cannot connect to the server and whether a charging request is received from the electric vehicle charging station or the mobile device;
    performing, by the electric vehicle charging station, an offline management operation to determine whether the contract situation corresponding to the user identification code is in the contract expiration status or the arrears unpaid status in response to the charging request when the network is disconnected and the electric vehicle charging station cannot be connected to the server;
    performing, by the electric vehicle charging station, the charging operation to output power when the contract situation is not in the contract expiration status or the arrears unpaid status; and
    rejecting, by the electric vehicle charging station, the charging request when the contract situation is in the contract expiration status or the contract situation is in the arrears unpaid status.

2. The method of claim 1, further comprising:
    generating an online payment link based on the contract situation and determining whether a payment operation has been completed through the online payment link by the server; and
    updating the contract situation and transmitting a charging permission instruction to the electric vehicle charging station through the network by the server when the payment operation has been completed through the online payment link.

3. The method of claim 1, further comprising setting a flag to a first value by the electric vehicle charging station in response to the charging rejection instruction, wherein the electric vehicle charging station cannot output power when the flag is marked as the first value.

4. The method of claim 3, further comprising:
    transmitting a charging permission instruction to the electric vehicle charging station via the network by the server; and
    setting the flag to a second value by the electric vehicle charging station in response to the charging permission instruction, wherein the electric vehicle charging station allows the output of power when the flag is marked as the second value.

5. The method of claim 1, further comprising:
    obtaining vehicle identification data of a vehicle by the electric vehicle charging station;
    transmitting the vehicle identification data to the server through the network by the electric vehicle charging station;
    determining whether the vehicle identification data corresponds to the user identification code or the corresponding contract situation by the server; and
    instructing the electric vehicle charging station to perform the charging operation through the network by the server when the vehicle identification data corresponds to the user identification code or the corresponding contract situation.

6. A subscription-based electric vehicle charging management system for use in a charging field, comprising:
    at least one electric vehicle charging station; and
    a server coupled to the electric vehicle charging station through a network, receiving a charging request from the electric vehicle charging station or a mobile device through the network, wherein the charging request includes at least a user identification code, searching a database to obtain a contract situation corresponding to the user identification code according to the user identification code, and determining whether the contract situation corresponding to the user identification code is in a contract expiration status or an arrears unpaid status, wherein the server instructs the electric vehicle charging station to perform a charging operation through the network when the contract situation is not in the contract expiration status or the arrears unpaid status and the server transmits a charging rejection instruction to the electric vehicle charging station through the network when the contract situation is in the contract expiration status or the contract situation is in the arrears unpaid status, wherein the electric vehicle charging station rejects the charging request in response to the charging rejection instruction, and wherein the server further transmits the contract situation to the electric vehicle charging station through the network when a network connection between the server and the electric vehicle charging station is connected, and the electric vehicle charging station is configured to determine whether the network is disconnected so that the electric vehicle charging station cannot connect to the server and whether a charging request is received from the electric vehicle charging station or the mobile device, and perform an offline management operation to determine whether the contract situation corresponding to the user identification code is in the contract expiration status or the arrears unpaid status in response to the charging request when the network is disconnected and the electric vehicle charging station cannot be connected to the server, and the electric vehicle charging station performs the charging operation to output power when the contract situation is not in the contract expiration status or the arrears unpaid status and rejects the charging request when the contract situation is in the contract expiration status or the contract situation is in the arrears unpaid status.

7. The system of claim 6, wherein the server further generates an online payment link based on the contract situation and determines whether a payment operation has been completed through the online payment link, and the server further updates the contract situation and transmits a charging permission instruction to the electric vehicle charging station through the network when the payment operation has been completed through the online payment link.

8. The system of claim 6, wherein the electric vehicle charging station further obtains vehicle identification data of a vehicle and transmits the vehicle identification data to the server through the network, and the server determines whether the vehicle identification data corresponds to the user identification code or the corresponding contract situation and instructs the electric vehicle charging station to perform the charging operation through the network when the vehicle identification data corresponds to the user identification code or the corresponding contract situation.

9. The system of claim 6, wherein the electric vehicle charging station further sets a flag to a first value in response to the charging rejection instruction, wherein the electric vehicle charging station cannot output power when the flag is marked as the first value.

10. The system of claim 9, wherein the server further transmits a charging permission instruction to the electric vehicle charging station via the network, and in response to the charging permission instruction, the electric vehicle charging station sets the flag to a second value, wherein the electric vehicle charging station allows the output of power when the flag is marked as the second value.

11. A machine-readable storage medium comprising a computer program, which, when executed, causes a device to perform a subscription-based electric vehicle charging management method for use in a charging field with at least one electric vehicle charging station and the electric vehicle charging station is connected to a server through a network, wherein the method comprises:

receiving a charging request from the electric vehicle charging station or a mobile device through a network by the server, wherein the charging request includes at least a user identification code;

searching a database to obtain a contract situation corresponding to the user identification code according to the user identification code by the server;

determining whether the contract situation corresponding to the user identification code is in a contract expiration status or an arrears unpaid status by the server;

instructing the electric vehicle charging station to perform a charging operation through the network by the server when the contract situation is not in the contract expiration status or the arrears unpaid status;

transmitting a charging rejection instruction to the electric vehicle charging station through the network by the server when the contract situation is in the contract expiration status or the contract situation is in the arrears unpaid status; and in response to the charging rejection instruction, rejecting the charging request by the electric vehicle charging station, wherein the method further comprises the steps of:

transmitting, by the server, the contract situation to the electric vehicle charging station through the network when a network connection between the server and the electric vehicle charging station is connected;

determining, by the electric vehicle charging station, whether the network is disconnected so that the electric vehicle charging station cannot connect to the server and whether a charging request is received from the electric vehicle charging station or the mobile device;

performing, by the electric vehicle charging station, an offline management operation to determine whether the contract situation corresponding to the user identification code is in the contract expiration status or the arrears unpaid status in response to the charging request when the network is disconnected and the electric vehicle charging station cannot be connected to the server:

performing, by the electric vehicle charging station, the charging operation to output power when the contract situation is not in the contract expiration status or the arrears unpaid status; and rejecting, by the electric vehicle charging station, the charging request when the contract situation is in the contract expiration status or the contract situation is in the arrears unpaid status.

\* \* \* \* \*